March 3, 1953  V. I. ZELOV  2,630,476
SCIENTIFIC INSTRUMENT
Filed Nov. 6, 1950  2 SHEETS—SHEET 2

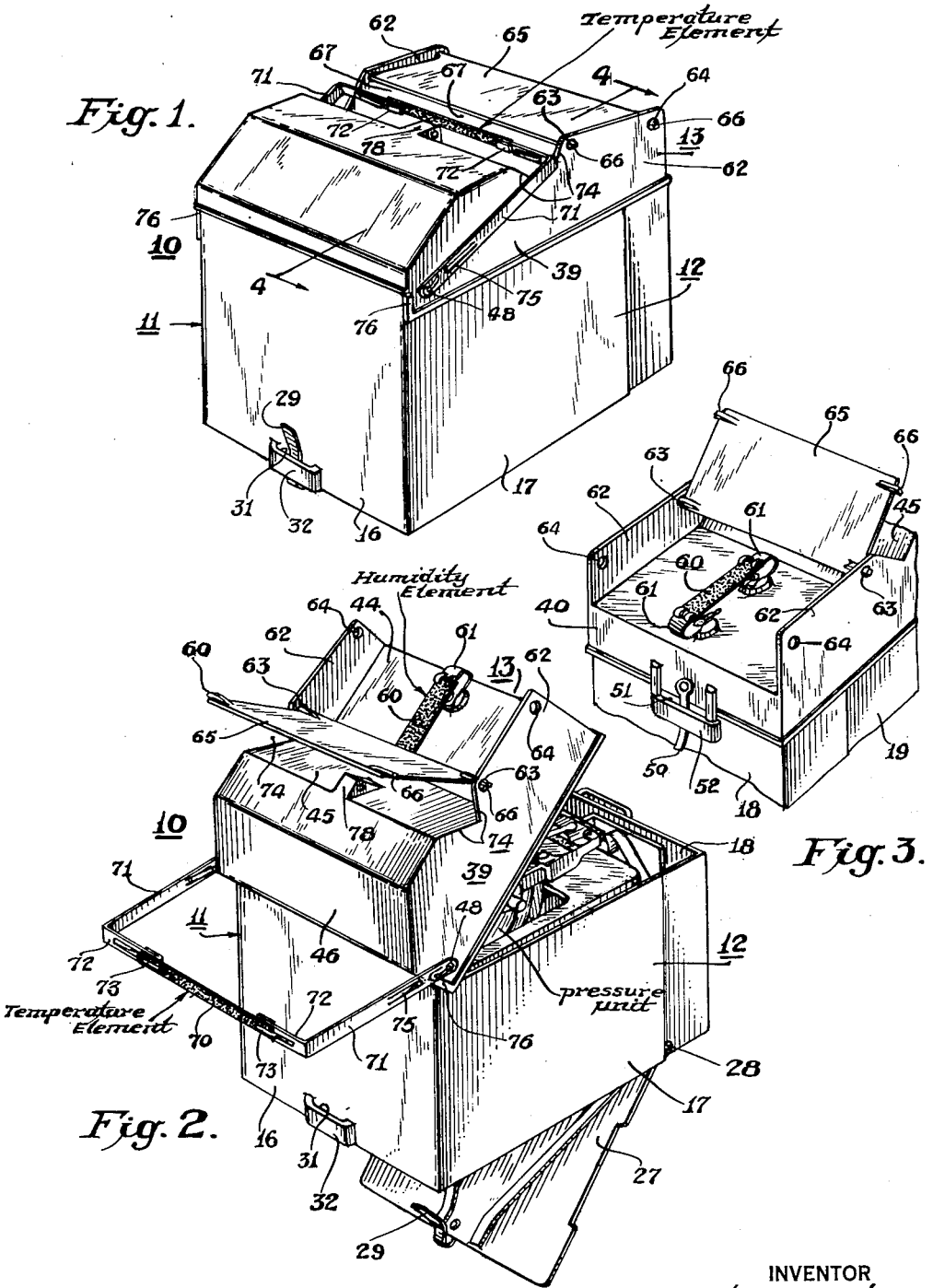

INVENTOR
Victor I. Zelov
BY
Robert T. French
ATTORNEY

Patented Mar. 3, 1953

2,630,476

UNITED STATES PATENT OFFICE 2,630,476

SCIENTIFIC INSTRUMENT

Victor I. Zelov, Rosemont, Pa.

Application November 6, 1950, Serial No. 194,243

5 Claims. (Cl. 175—298)

This invention relates to scientific instruments, more particularly to radiosondes, and has for an object to provide improved apparatus of this character.

A radiosonde is a meteorological instrument that measures weather conditions in the upper air and automatically transmits the information by radio to a meteorological receiving station. The radiosonde is carried aloft by a gas-filled free balloon, and during its upward travel automatically transmits radio signals which are a function of the barometric pressure, temperature, and humidity at the radiosonde. Since the balloon drift is a function of wind direction and wind speed, a meteorological radio direction finder may be utilized to track the radiosonde throughout its flight when data on wind direction and speed are desired, as in making weather predictions, calculating corrections to compensate for effects of wind direction and speed on artillery fire and guided missile flight, planning aircraft operations, etc.

It will be apparent that with a balloon-borne instrument of this character, weight reduction is of prime importance, particularly as the instrument weight directly affects the maximum altitude and rate of ascent attainable with a given size of balloon.

Heretofore, such instruments have generally been housed in casings or containers constructed of cardboard or similar material, but were bulky and their cardboard containers subject to deterioration during storage or transportation due to various causes such as dampness, fungus attacks in tropical areas, improper handling, etc.

Accordingly, another object of the present invention is to provide a radiosonde container constructed of light-weight, durable material capable of withstanding deteriorating attacks damaging to prior containers.

Yet another object of the invention is to provide a radiosonde container of extreme compactness, resulting in reduced volume and corresponding reduced weight.

These and other objects are effected by the invention as will be apparent from the following description and claims, taken in accordance with the accompanying drawings, in which:

Fig. 1 is a perspective view of a radiosonde constructed in accordance with the present invention;

Fig. 2 is a similar view, but with various movable portions disposed in different positions;

Fig. 3 is a fragmentary perspective of one end of the cover portion, viewed from the end opposite to that shown in Figs. 1 and 2;

Figure 4:
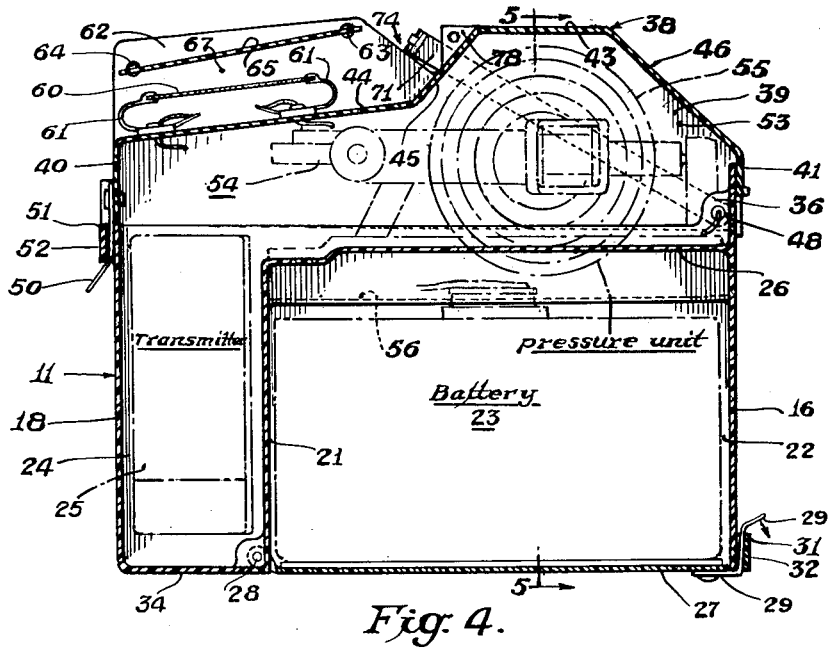
Fig. 4 is a vertical sectional view, taken along the line IV—IV of Fig. 1, looking in the direction indicated by the arrows; and, Fig. 5 is a vertical sectional view, taken along the line V—V of Fig. 4, looking in the direction indicated by the arrows.

Referring now to the drawings in greater detail, the reference character 10 indicates, in its entirety, a radiosonde having a casing or container 11. In the construction herein illustrated, the container is constructed of plastic, although it will be apparent that other materials may be utilized provided they present the necessary durability and resistance to deterioration.

As best shown in Figs. 1 and 2, the container 11 includes a body portion 12 and a cover portion 13.

The body portion 12 comprises four side walls 16, 17, 18 and 19 defining a generally cuboidal space. This space is divided, by a transverse partition 21, into a compartment 22 for the battery 23, and a compartment 24 for the transmitter mechanism 25. (See Fig. 4.)

A stepped horizontal partition 26 permanently closes the battery compartment 22 at the top thereof, access to the battery compartment being had through the bottom thereof. This bottom access opening is provided with a closure member 27 pivotally mounted at one edge, as at 28, and provided at the opposite edge with suitable means for retaining it at compartment-closing position. As illustrated in Figs. 1, 2, and 4, this retaining means may comprise a deformable metal tongue 29 carried by the closure and whose free end is passed upwardly through the mating slot 31 in the boss 32, provided on the body portion side wall, and then bent downwardly over the edge of boss.

The transmitter compartment 24 is permanently closed at the bottom by the wall 34 (Fig. 4). In accordance with the invention, the four side walls 16, 17, 18 and 19, the transverse partition 21, the top wall 26 of the battery compartment, and the bottom wall 34 of the transmitter compartment are formed as a fixed and unitary structure devoid of cracks or joints at their regions of contact with one another. It will be apparent from consideration of Fig. 4 that the above described unitary construction results in complete separation of the battery compartment 22 from the transmitter compartment 24 with the result that any possibility of leakage of battery fumes or gases into the transmitter compartment is entirely and positively eliminated. Possibility of such leakage has constituted a serious defect in prior cardboard containers.

The body portion side walls 17 and 19 are each provided with an upwardly-extending ear (Fig. 4) at their ends adjacent the joining side wall 16. Pivotally mounted on this pair of ears 36 is the cover portion 13, movable between an open position, illustrated in Fig. 2 and a closed position, shown in Figs. 1, 3 and 4.

The cover portion 13 includes a top wall 38, opposed depending side walls 39, and opposed depending end walls 40 and 41. The top wall 38 is of special configuration, as best illustrated in Fig. 4, and comprises upper and lower approximately horizontal sections 43 and 44, respectively, and joined by an inclined section 45. An oppositely-inclined section 46 connects the other edge of the upper horizontal section 44 with the adjacent depending wall 41.

Figure 5:
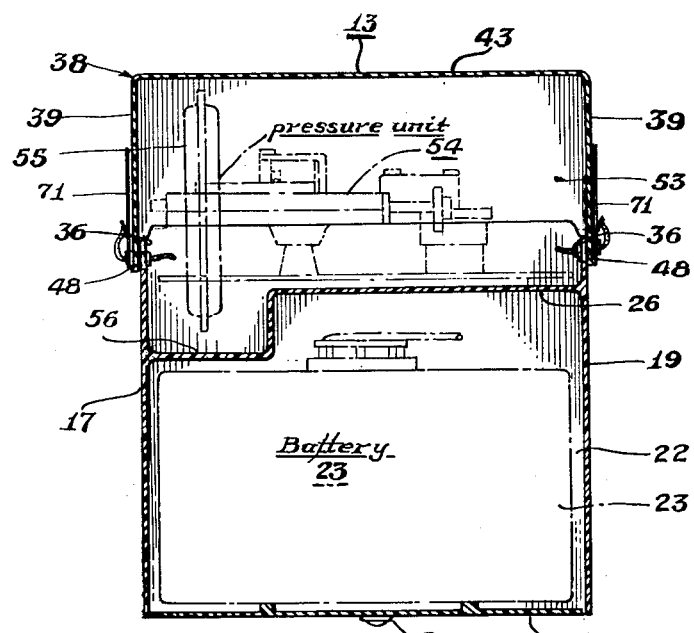

As shown in Fig. 5, the opposed depending side walls 39 of the cover portion 13 overlap the ears 36 and have pivot bushings 48 extending through the lapping ears 36 and side walls 39 to effect pivotal mounting of the cover portion 13 on the body portion 12. The cover portion 13 may be retained in container-closing position by means similar to that provided for fastening the battery compartment closure 27. To this end, the cover portion end wall 40 carries a deformable tongue 50 adapted to cooperate with the slot 51 of the boss 52 at the upper edge of the body portion side wall 18 (Figs. 3 and 4).

As clearly shown in Figs. 4 and 5, the top and side walls of the cover portion 13 cooperate with the horizontal stepped partition 26 to define a modulator compartment 53 directly above the battery compartment 22.

The modulator apparatus, shown in dot-dash lines and indicated in its entirety by the reference character 54, may be of a type customarily utilized in radiosondes, and forms no part of the present invention. The same is true of the battery and the transmitter apparatus 25.

In order to provide necessary space for the disc-like pressure unit 55 of the modulator apparatus 54, while maintaining overall dimensions of the container 11, the top wall sections 43, 45 and 46 are associated as previously described to provide an inverted trough closely receiving upper part of the pressure unit. Space for the lower part of said pressure unit is provided by the well-shaped construction of the horizontal partition 26, which, with the adjacent side wall 17, forms the trough 56 (Fig. 5).

The present invention includes novel means for exposing the humidity element 60 to the atmosphere while simultaneously protecting it from contact with rain. A pair of opposed clips 61 are mounted on the outer top side of the approximately horizontal section 44 of the cover portion top wall (Figs. 3 and 4) and removably support the humidity element 60. The side walls 39 of the cover portion include vertical extensions 62 above and at opposite sides of the top wall section 44 on which the humidity element is mounted. These extensions have opposed pairs of openings 63 and 64 near their upper edges, with the openings 63 slightly higher than the openings 64. A plate 65 is provided with pairs of lugs 66 projecting laterally from opposite side edges thereof, the lugs 66 being received in the openings 63 and 64. As best shown in Fig. 4, the plate 65 provides, in effect, a sloping roof for a rectangular passage 67 housing the humidity element, whereby rain is deflected.

It will be noted that the inclined section 45 of the top wall is disposed adjacent one end of the passage 67 and serves to deflect air through the passage 67 as the radiosonde rises in the air.

Inasmuch as the vertical extensions 62 are flexible, they may be sprung apart in the region of their openings 64 sufficiently to release the lugs 66 normally disposed in the openings 64, with the result that the plate 65 may be moved to the passage-opening position shown in Figs. 2 and 3 to render readily accessible the humidity element 60.

The usual temperature element 70 is provided with novel mounting structure including a pair of arms 71 pivotally mounted on the same pivot bushings 48 which connect the cover portion 13 to the body portion 12. The arms are L-shaped with the feet 72 of the L's directed toward each other and having clips 73 retaining the temperature element 70. When not in use, as when packed for transportation, the L-shaped arms 71 are swung into the position in Figs. 1 and 4, where the feet of the L-shaped arms lie in what in effect constitutes a trough 74 in the top wall structure. When the radiosonde is to be sent up, the arms 71 are swung to the position shown in Fig. 2 with the temperature element 70 disposed outside of the plan profile of the container so that it is swept by air currents during rise of the instrument. To retain the arms 71 in their operative position, shown in Fig. 2, each arm has an integral tongue 75 formed therein with the free end of the tongue projecting from the plane of the arm in such a manner as to resiliently slide over the cover portion depending side walls while being pivoted to operative position. When operative position is reached, the tongue 75 projects behind the cover portion end wall to lock the arm. Bosses 76 on the cover portion side walls function as stops to limit the movement of the arms 71 in an outward direction when operative position has been reached.

A boss 78 may be provided on the inclined section 45 for attachment of the usual parachute and balloon, in a well-known manner.

While the invention has been shown in but one form, it will be apparent that it is not so limited but is susceptible of various changes and modifications without departing from the spirit thereof.

What is claimed is:

1. In a radiosonde container, a body portion including four side walls defining a generally cuboidal space, a transverse partition extending between two opposed side walls and dividing said space into a battery compartment and a transmitter compartment, closure structure for the lower ends of said compartments; a cover portion pivotally mounted on the body portion and including a top wall and four side walls depending from said top wall, and adapted to mate with the upper edges of the body portion side walls when the cover portion is in container-closing position, said top wall including a pair of vertically-spaced and laterally offset sections lying in approximately horizontal planes, and a third inclined section joining said pair of sections at their adjacent edges, and means carried by the lower of said approximately horizontal sections for supporting a humidity element thereon in the path of pair deflected therepast by the inclined section during operation of the radiosonde.

2. Structure as specified in claim 1, wherein an opposed pair of the cover portion side walls project upwardly above the lower section of the pair of top wall sections, and including a guard plate supported by and bridging the space between said upwardly projecting side walls in overlying spaced relation to said lower section and a humidity element supported by the latter, whereby such humidity element is protected from direct contact by rain during operation of the radiosonde.

3. In a radiosonde container, a box-like body portion including four side walls, a transverse partition extending between two opposed side walls and dividing the space enclosed by said four side walls into a battery compartment and a transmitter compartment; a cover portion pivotally mounted at one end on the corresponding end of the body portion and including a top wall and four side walls depending from said top wall and adapted to mate with the upper edges of the body portion side walls when the cover portion is in container-closing position, one opposed pair of said cover portion side walls lying in planes normal to the axis about which the cover portion is mounted to pivot, said pair of cover portion side walls each having a notch in its upper edge, and a pair of temperature element supports mounted externally of said pair of cover portion side walls for pivotal movement about the same axis the cover portion is mounted to pivot about, said supports being pivotable between an inoperative position where their free end portions extend through the notches of said side walls below the uppermost portion of the cover portion top wall and an operative position where their free ends project outside of the plan profile of the container.

4. Structure as specified in claim 3 including pivot bushings pivotally mounting the cover portion on the body portion and the temperature element supports on the cover portion, said bushings having bores axially therethrough for passage of wires from the temperature element to the interior of the container.

5. In a radiosonde container, a body portion including side wall structure and an approximately vertical partition cooperating to define a battery compartment and a transmitter compartment, a fixed bottom wall closing the lower end of the transmitter compartment, closure structure for the lower ends of said compartments, and a cover portion pivotally mounted on the body portion and including a top wall, and side wall structure depending from said top wall and adapted to mate with the upper edge of the body portion side wall structure when the cover portion is in container-closing position and to define, with the top wall and the body portion fixed upper wall, a modulator compartment, said top wall including a pair of vertically-spaced and laterally-offset sections lying in approximately horizontal planes, and a third inclined section joining said pair of sections at their adjacent edges, and means carried by the lower of said vertically-spaced sections for supporting a humidity element thereon in the path of air deflected therepast during operation of the radiosonde.

VICTOR I. ZELOV.

REFERENCES CITED

The following references are of record in the file of this patent:

UNITED STATES PATENTS

| Number | Name | Date |
| --- | --- | --- |
| Re. 23,203 | Posen | Mar. 7, 1950 |
| 1,239,881 | Cawby | Sept. 11, 1917 |
| 2,152,589 | Haas | Mar. 28, 1939 |
| 2,180,107 | Hathaway | Nov. 14, 1939 |

FOREIGN PATENTS

| Number | Country | Date |
| --- | --- | --- |
| 15,201 | Great Britain | of 1907 |